(12) United States Patent
Lazarescu et al.

(10) Patent No.: US 11,190,543 B2
(45) Date of Patent: Nov. 30, 2021

(54) METHOD AND SYSTEM FOR DETECTING AND MITIGATING A DENIAL OF SERVICE ATTACK

(71) Applicant: Curtin University of Technology, Perth (AU)

(72) Inventors: Mihai Mugurel Lazarescu, Perth (AU); Sie Teng Soh, Perth (AU); Subhash Kak, Stillwater, OK (US); Stefan Prandl, Victoria Park (AU)

(73) Assignee: HYPRFIRE PTY LTD, Subiaco (AU)

( * ) Notice: Subject to any disclaimer, the term of this patent is extended or adjusted under 35 U.S.C. 154(b) by 114 days.

(21) Appl. No.: 16/477,855

(22) PCT Filed: Jan. 15, 2018

(86) PCT No.: PCT/AU2018/050022
§ 371 (c)(1),
(2) Date: Jul. 12, 2019

(87) PCT Pub. No.: WO2018/129595
PCT Pub. Date: Jul. 19, 2018

(65) Prior Publication Data
US 2020/0128040 A1 Apr. 23, 2020

(30) Foreign Application Priority Data
Jan. 14, 2017 (AU) .................. 2017900103

(51) Int. Cl.
*H04L 29/06* (2006.01)
(52) U.S. Cl.
CPC ...... *H04L 63/1458* (2013.01); *H04L 63/1425* (2013.01)
(58) Field of Classification Search
CPC .............. H04L 63/1458; H04L 63/1425
See application file for complete search history.

(56) References Cited

U.S. PATENT DOCUMENTS 9,055,006 B2 * 6/2015 Chesla .................. H04L 45/42
9,094,445 B2 * 7/2015 Moore .................. H04L 47/11
(Continued)

FOREIGN PATENT DOCUMENTS

KR 101326804 B1 11/2013

OTHER PUBLICATIONS

Asadi, "An Approach for Detecting Anomalies by Assessing the Inter-Arrival Time of UDP Packets and Flows Using Benford's Law," 2nd International Conference on Knowledge-Based Engineering and Innovation, Nov. 2015, pp. 402-410.
(Continued)

*Primary Examiner* — Joseph P Hirl
*Assistant Examiner* — Stephen T Gundry
(74) *Attorney, Agent, or Firm* — Miller Nash LLP (57) ABSTRACT

A method and system for detecting and mitigating a denial of service attack against a destination server (12) and/or connected devices (14). Incoming traffic packets (26) are monitored and a first distribution of the incoming traffic packets (26) is built in accordance with Benford's Law for normal traffic behaviour. A denial of service attack is detected when it occurs. Once an attack is detected, the incoming traffic packets (26/28) are sorted in accordance with Zipf's Law and a sorted distribution is created. The sorted distribution is compared with the first distribution. The incoming traffic packets (28) in the sorted distribution that are not consistent with the first distribution are discarded. A second distribution is then built in accordance with Benford's Law using the incoming traffic packets (28) in the sorted distribution excluding the discarded incoming traffic packets. The incoming traffic packets in the second distribution are allowed to pass to the destination server (12) and/or connected devices (14).

15 Claims, 3 Drawing Sheets

(56) References Cited

U.S. PATENT DOCUMENTS

| | | | | |
|---|---|---|---|---|
| 9,167,004 | B2* | 10/2015 | Pappu | H04L 43/026 |
| 10,728,280 | B2* | 7/2020 | Reddy | H04L 63/1458 |
| 2006/0075084 | A1* | 4/2006 | Lyon | H04L 65/104 709/223 |
| 2006/0107318 | A1* | 5/2006 | Jeffries | G06F 21/55 726/22 |
| 2008/0262990 | A1* | 10/2008 | Kapoor | H04L 63/1408 706/20 |
| 2008/0295175 | A1* | 11/2008 | Ansari | H04L 63/1416 726/23 |
| 2011/0231564 | A1* | 9/2011 | Korsunsky | H04L 63/1483 709/231 |
| 2011/0238855 | A1* | 9/2011 | Korsunsky | G06F 21/56 709/231 |
| 2011/0320617 | A1* | 12/2011 | Annamalaisami | H04L 63/1458 709/228 |
| 2012/0216282 | A1* | 8/2012 | Pappu | H04L 47/80 726/23 |
| 2012/0240185 | A1* | 9/2012 | Kapoor | H04L 41/0866 726/1 |
| 2013/0333029 | A1* | 12/2013 | Chesla | H04L 67/327 726/22 |
| 2014/0157405 | A1* | 6/2014 | Joll | H04L 63/1425 726/22 |
| 2014/0283030 | A1* | 9/2014 | Moore | H04L 63/0263 726/22 |
| 2016/0036837 | A1* | 2/2016 | Jain | H04L 63/1416 726/23 |
| 2016/0044054 | A1* | 2/2016 | Stiansen | H04L 63/1416 726/24 |
| 2016/0366160 | A1* | 12/2016 | Kapoor | H04L 63/1425 |
| 2016/0381048 | A1 | 12/2016 | Zhao et al. | |
| 2017/0006059 | A1 | 1/2017 | Meulenhoff et al. | |
| 2017/0251018 | A1* | 8/2017 | Ast | H04L 63/1416 |
| 2018/0007084 | A1* | 1/2018 | Reddy | H04L 63/1458 |
| 2018/0063187 | A1* | 3/2018 | St. Pierre | H04L 63/1433 |
| 2018/0131718 | A1* | 5/2018 | Chien | H04L 63/101 |
| 2018/0183831 | A1* | 6/2018 | Amin | H04L 63/0236 |

OTHER PUBLICATIONS

Gottwalt, F. et al., "Natural laws as a baseline for network anomaly detection," Trustcom & BigDataSE & ISPA, 2016, pp. 370-377.

International Preliminary Report on Patentability issued in International Application No. PCT/AU2018/050022, dated Jul. 16, 2019, 6 pages.

International Search Report and Written Opinion of the International Searching Authority issued in International Application No. PCT/AU2018/050022, dated Mar. 15, 2018, 10 pages.

Iorliam, Application of Power Laws to Biometrics, Forensics and Network Traffic Analysis, Faculty of Engineering and Physical Sciences, Department of Computer Science, University of Surrey, Nov. 2016, pp. 80-84, 89-91, 95-100, 102-103, 106.

Jamain, Benford's Law, Master's Thesis, Imperial College of London and ENSIMAG, 2001, 69 pages.

Moreno-Sánchez, "Large-scale analysis of Zipf's law in English texts," arXiv:1509.04486v1 [stat.AP] Sep. 15, 2015, 11 pages.

Prandl, PEIMA: Harnessing Power Laws to Detect Malicious Activities from Denial of Service to Intrusion Detection Traffic Analysis and Beyond, Curtin University; Jul. 24, 2017, 12 pages.

* cited by examiner

METHOD AND SYSTEM FOR DETECTING AND MITIGATING A DENIAL OF SERVICE ATTACK

CROSS-REFERENCE TO RELATED APPLICATIONS

This application is a national stage filing under 35 U.S.C. § 371 of International Application No. PCT/AU2018/050022, filed Jan. 15, 2018, entitled "METHOD AND SYSTEM FOR DETECTING AND MITIGATING A DENIAL OF SERVICE ATTACK," and claims priority from Australian Provisional Patent Application No. 2017900103, filed Jan. 14, 2017, the disclosures of both of which are incorporated herein by reference in their entirety.

Throughout this specification, unless the context requires otherwise, the word "comprise" and variations such as "comprises", "comprising" and "comprised" are to be understood to imply the presence of a stated integer or group of integers but not the exclusion of any other integer or group of integers.

Throughout this specification, unless the context requires otherwise, the word "include" and variations such as "includes", "including" and "included" are to be understood to imply the presence of a stated integer or group of integers but not the exclusion of any other integer or group of integers.

TECHNICAL FIELD

The present invention relates a method and system for detecting and mitigating a denial of service attack, and to a non-transitory computer readable storage medium.

BACKGROUND ART

Any discussion of background art, any reference to a document and any reference to information that is known, which is contained in this specification, is provided only for the purpose of facilitating an understanding of the background art to the present invention, and is not an acknowledgement or admission that any of that material forms part of the common general knowledge in Australia or any other country as at the priority date of the application in relation to which this specification has been filed.

Today, Internet presence and service availability are key aspects for most organisations, including businesses as well as government agencies and authorities, and are fundamental requirements for conducting all e-commerce. These organisations may provide a significant part, and in some cases all, of their services and interactions with users and customers via their online Internet presence. However, parties with malicious intent ("malicious parties"), ranging from individuals to criminal groups and state-based parties, actively target organisations and interfere with and disrupt the online services provided by targeted organisations. Whilst the motives of such malicious parties may vary, the purpose of their actions is to disrupt the online services provided by such organisations. An often used way in which such malicious parties seek to disrupt the online services provided by such organisations is a denial of service (DoS) attack.

A DoS attack is a type of cyber-attack on an organisation's computer system, e.g. a network/s, server/s, machine/s, and/or application/s, that is designed to render the computer system inoperative by overwhelming the targeted system with artificially created traffic. This results in a failure of the service provided via the targeted system due to an inability of the system to process the incoming traffic in a timely manner. In short, the volume of incoming traffic far exceeds the processing capacity of the computer system attacked, and thus the service is commonly taken offline causing a disruption to the service. Clearly, this is undesirable for both the organisation providing the service and for legitimate users of the service.

DoS attacks have become an increasing threat to the normal operational capabilities of government instrumentalities and businesses, ranging from large multi-national conglomerates to businesses that are very small in size. The reasons for the increasing threat may be seen as twofold. Firstly, despite a consistent effort to handle DoS attacks, such attacks nevertheless have a major impact on the target (e.g. in terms of time and resources required to handle the attacks). Secondly, the nature of these attacks means that, from a technical standpoint, they are relatively simple to carry out, exploiting existing systems and devices that are connected to the Internet. DoS attacks may even be carried out solely using portable devices and can nevertheless generate twice the volume of traffic of the previously record setting attack (620 GB/s). As more and more devices that lack proper security or are misconfigured are connected to the Internet, the number of systems that are susceptible to DoS attacks increases.

The current state-of-the-art technology uses various approaches to reduce the impact of a DOS attack.

The common approaches at the network level include:
filtering based on IP information—the IP address of the incoming traffic is analysed and correlated with past malicious behaviour;
filtering based on the ratio between the incoming and outgoing volumes of traffic—the traffic volume is analysed based on the "expected" and "actual" traffic volume ratio of the data sent and the data received by the system;
filtering based on the volume of traffic generated—the volume of traffic that is received is analysed and compared with well-established trends; and
collaborative distributed analysis of traffic—the data collected at the router level at different locations is analysed to determine if there is any unexpected increase in traffic (which is indicative that there is data from an attack).

The common approaches at the application level include:
anomaly detection—the traffic for a target application is analysed to determine whether it complies with normal trends;
destination traffic analysis—the IP address that the application is sending data to is analysed to determine whether or not the destination is within expected application behaviour;
trust analysis—the requests to the application are rated based on the "reputation" of the IP address groups that are submitting the requests (thus, known "black listed" addresses can be ignored);
human vs bots behaviour analysis—the speed and variety of the perceived activity is compared with that of known human behavior (thus, systematic or very fast requests are discarded as being generated by automated means, which is indicative of an attack); and
session analysis—the session activity and duration are analysed to determine whether or not they are within the bounds of previously observed "normal" session activity and duration, and discarding sessions that are opened but for which no further requests are received.

However, these approaches may suffer from various problems. These problems include: (1) they may be susceptible to packet crafting (spoofing); (2) they may be reliant on deep packet inspection; and/or (3) they may require specific traffic properties to be satisfied in order for the filtering to work.

SUMMARY OF INVENTION

In accordance with one aspect of the present invention there is provided a method for detecting and mitigating a denial of service attack comprising monitoring incoming traffic packets directed to at least one destination server and/or connected devices, building a first distribution of the incoming traffic packets in accordance with Benford's Law of normal traffic behaviour directed to the at least one destination server and/or connected devices, detecting a denial of service attack directed at the destination server and/or connected devices, sorting in accordance with Zipf's Law the incoming traffic packets directed to the at least one destination server and/or connected devices after detecting the denial of service attack and creating a sorted distribution of incoming traffic packets, comparing the sorted distribution of incoming traffic packets with the first distribution of the incoming traffic packets, discarding the incoming traffic packets in the sorted distribution that are not consistent with the first distribution, building a second distribution in accordance with Benford's Law using the incoming traffic packets in the sorted distribution excluding the discarded incoming traffic packets, and allowing the incoming traffic packets in the second distribution to pass to the destination server and/or connected devices.

In accordance with another aspect of the present invention, there is provided a non-transitory computer readable storage medium including instructions that, when executed by a processor, cause the following steps to be performed monitoring incoming traffic packets directed to at least one destination server and/or connected devices, building a first distribution of the incoming traffic packets in accordance with Benford's Law of normal traffic behaviour directed to the at least one destination server and/or connected devices, detecting a denial of service attack directed at the destination server and/or connected devices, sorting in accordance with Zipf's Law the incoming traffic packets directed to the at least one destination server and/or connected devices after detecting the denial of service attack and creating a sorted distribution of incoming traffic packets, comparing the sorted distribution of incoming traffic packets with the first distribution of the incoming traffic packets, discarding the incoming traffic packets in the sorted distribution that are not consistent with the first distribution, building a second distribution in accordance with Benford's Law using the incoming traffic packets in the sorted distribution excluding the discarded incoming traffic packets, and allowing the incoming traffic packets in the second distribution to pass to the destination server and/or connected devices.

In accordance with another aspect of the present invention, there is provided a system for detecting and mitigating a denial of service attack comprising at least one memory to store functional instructions, a processor operatively connected to the memory to execute the instructions stored in the memory such that the following steps are performed monitoring incoming traffic packets directed to at least one destination server and/or connected devices, building a first distribution of the incoming traffic packets in accordance with Benford's Law of normal traffic behaviour directed to the at least one destination server and/or connected devices, detecting a denial of service attack directed at the destination server and/or connected devices, sorting in accordance with Zipf's Law the incoming traffic packets directed to the at least one destination server and/or connected devices after detecting the denial of service attack and creating a sorted distribution of incoming traffic packets, comparing the sorted distribution of incoming traffic packets with the first distribution of the incoming traffic packets, discarding the incoming traffic packets in the sorted distribution that are not consistent with the first distribution, building a second distribution in accordance with Benford's Law using the incoming traffic packets in the sorted distribution excluding the discarded incoming traffic packets, and allowing the incoming traffic packets in the second distribution to pass to the destination server and/or connected devices.

Preferably, detecting a denial of service attack directed at the server and/or connected devices comprises detecting an increase in the volume of traffic directed to the at least one destination server and/or connected devices.

Preferably, a selected characteristic of the individual incoming data packets is used to build the first distribution.

Preferably, the selected characteristic that is used to build the first distribution is the inter-arrival time of the incoming traffic packets.

Preferably, the first distribution is a rolling distribution built using a moving window technique applied to the incoming traffic packets.

BRIEF DESCRIPTION OF DRAWINGS

The present invention will now be described, by way of example only, with reference to the accompanying drawings, in which.

DESCRIPTION OF EMBODIMENTS

Figure 1:
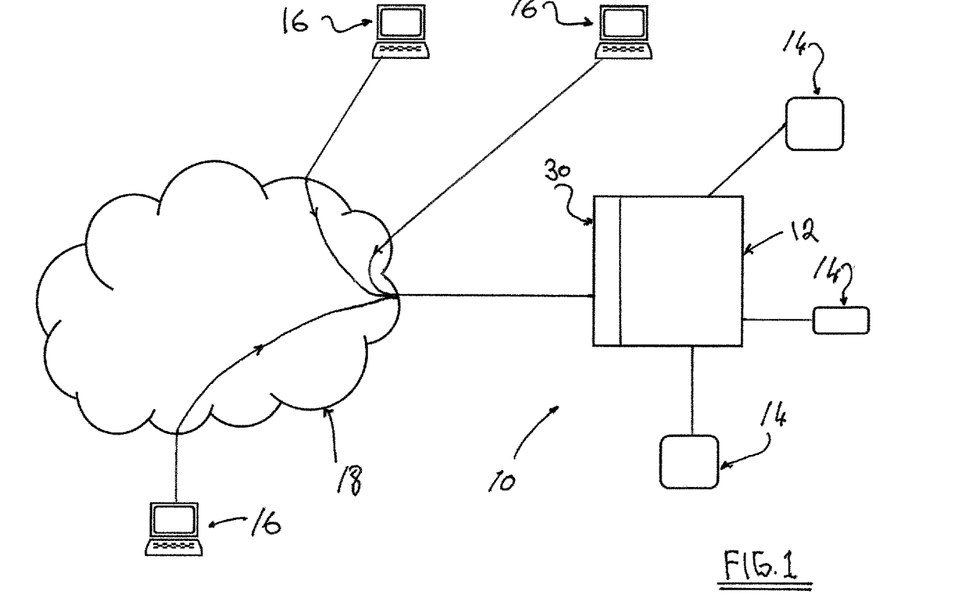
FIG. 1 is a schematic representation of an embodiment of a computer system environment in which the system and method of the present invention may be implemented.

FIG. 1 shows a schematic representation of a computer system environment in which the present invention may be implemented. Typically, the computer system, or network, 10 may comprise one or more servers 12. Various machines or devices 14, which may include other servers, may be connected to the server/s 12. However, the actual nature and composition of the computer system 10 is not in itself part of the present invention and the present invention may be implemented in any suitable computer system. The computer system 10 is connected to the Internet, which is represented by the cloud formation in FIGS. 1 and 2. Users may connect to the computer system 10 with user computers 16 via the Internet 18.

In normal operation, the user computers 16 can be used to send (and typically to also receive) data to (and from) the computer system 10 via the connections through the Internet 18, which is represented by the solid lines through the Internet cloud formation 18 in FIG. 1. Typically, the user computers 16 are located geographically remote from the computer system 10. FIG. 1 (and FIG. 2) shows three legitimate user computers 16 as being connected to the computer system 10 via the Internet 18. However, it is to be understood that this is merely a schematic representation; in a real life scenario, there may be a few, dozens, hundreds or even thousands of user computers 16 connected to the computer system 10.

Figure 2:
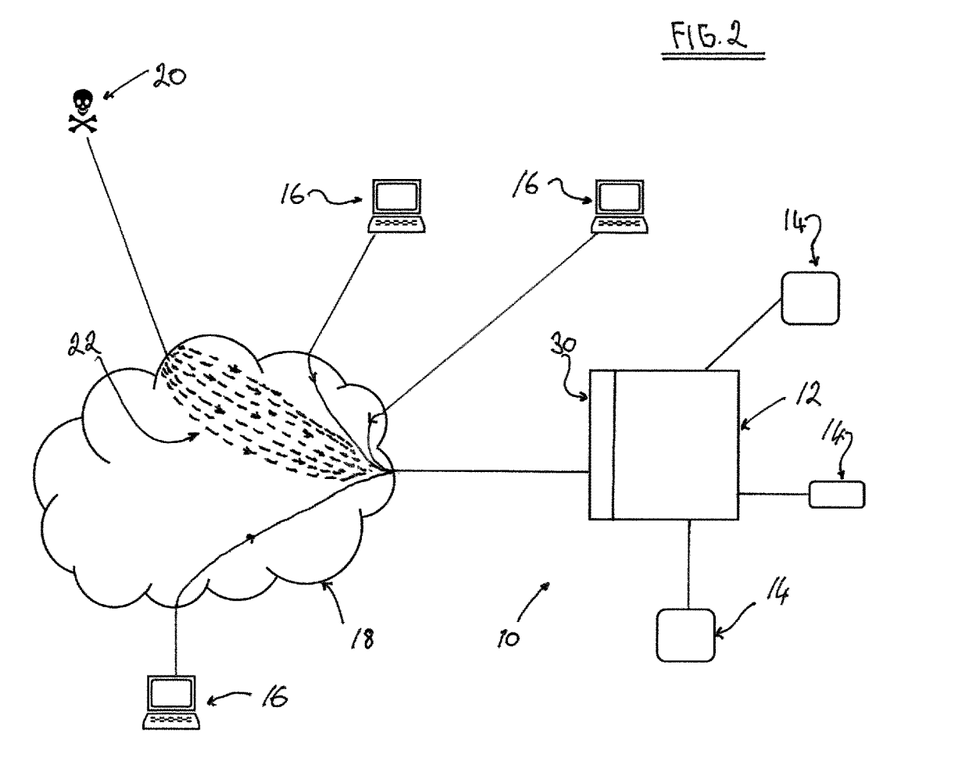
FIG. 2 is a schematic representation of a DoS attack launched by a malicious party in the computer system environment shown in FIG. 1.

FIG. 2 shows a schematic representation of a DoS attack launched by a malicious party 20, targeting the computer system 10. The DoS attack takes the form of a very high volume of traffic represented by multiple dashed lines, identified by reference numeral 22 in FIG. 2, targeted at the computer system 10. Typically, this is done by the malicious party 20 using one or more, e.g. a network of, computers and/or servers to create data, i.e. artificially created traffic, and direct it to the IP address of a server 12 (i.e. the destination server) of the computer system 10 that the operator of the computer system 10 has designated to receive data from users 16 via the Internet 18.

The present invention may be implemented to detect and mitigate the effects of a DoS attack on the computer system 10.

As a preliminary first step, which is undertaken under normal incoming traffic operating conditions, i.e. as represented in FIG. 1, a determination is made as to what constitutes normal behaviour for incoming traffic from the Internet 18 to the computer system 10. Thus, in this sense, normal behaviour may be considered as the level or volume of incoming traffic from legitimate user computers 16, i.e. when the computer system 10 is not the target of a DoS attack. This determination of normal behaviour is used in the present invention as is further described herein.

Figure 3:
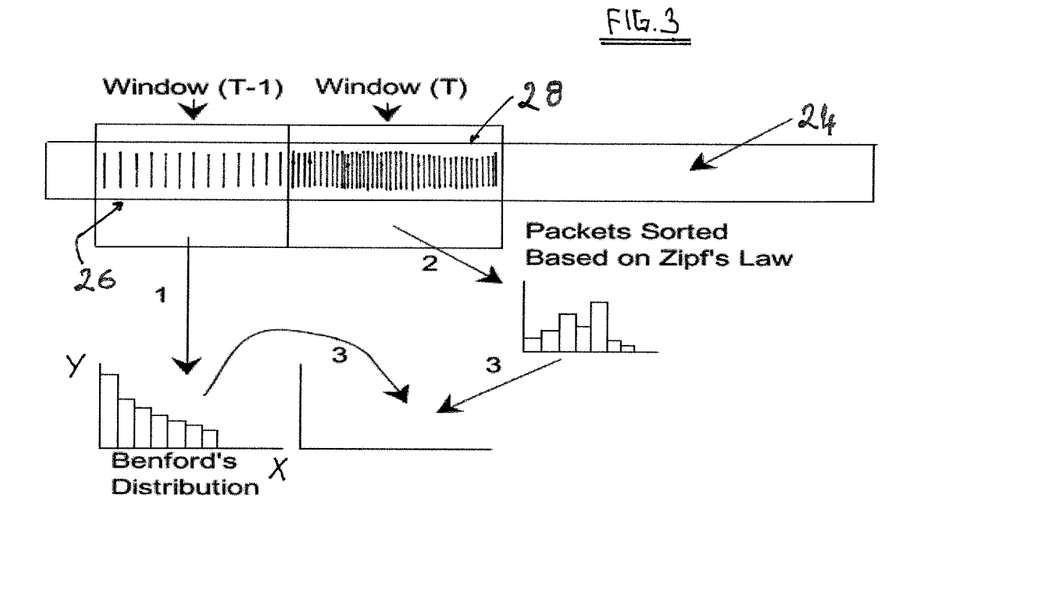
FIG. 3 is a schematic representation of an embodiment of the method for detecting and mitigating a denial of service attack in accordance with an aspect of the present invention.

With particular reference to FIG. 3, the incoming traffic stream 24 to the computer system 10 arrives in data packets. A moving window technique may be used to process the incoming traffic. In the preliminary first step, i.e. the normal behaviour modeling stage, the system of the present invention uses such a moving window T-1 to build a distribution of the incoming packets 26 of traffic. The distribution of normal traffic behaviour of the incoming packets 26 built by the system of the present invention is compliant with Benford's Law (which is a known statistical law and is further described herein) and, due to the moving window technique, may be used as a dynamic model of the incoming traffic observed. A dynamic model distribution is preferred in situations where normal traffic volumes vary over time, which is very often the case, e.g. over the course of a day or at different periods during a day. In such a dynamic model distribution (of the incoming packets 26 built by the system of the present invention that is compliant with Benford's Law), the moving window technique updates the current Benford's Law compliant distribution to ensure that the most up to date version of the normal (i.e. legitimate) traffic is captured for the Benford's Law compliant distribution before a DoS attack. Thus, this distribution may be described as a rolling Benford's Law compliant distribution. The creation of this distribution is shown at step 1 in FIG. 3. In that regard, from Benford's Law it is known that a set of numbers is said to satisfy Benford's law if the leading digit d occurs with probability:

$$Pr(D=d)=\log(1+1/d), \text{ where } d=1, \ldots, 9.$$

As Benford's Law is a known statistical law, it is well documented and its characteristics will not be herein described. However, by way of brief elucidation, Benford's Law shows that if a number is randomly selected from statistical data, the probability that the first digit in that selected number will be the digit "1" is approximately 0.301, the probability that the first digit in that selected number will be the digit "2" is approximately 0.176, the probability that the first digit in that selected number will be the digit "3" is approximately 0.125, and the probabilities for later successive digits decreases to the last digit, whereby the probability that the first digit in that selected number will be the digit "9" is approximately 0.046. Thus, Benford's Law shows that a number selected from statistical data is more likely to have a smaller digit than a larger digit as the first digit in the number.

To build the distribution in accordance with Benford's Law, some characteristic of the individual incoming data packets 26 must be used, (i.e. something that can be used to identify the individual incoming data packets 26). The particular characteristic used for this purpose may vary depending upon the specific type of incoming data packets 26. In that regard, a suitable characteristic is the inter-arrival times of the incoming data packets 26. The inter-arrival times of the incoming data packets 26 can be readily determined and this constitutes a form of shallow packet inspection as it does not inspect the actual contents of the incoming data packets 26. (This is in contrast to the more complex techniques of deep packet inspection which do inspect the actual contents of data packets.) Thus, the Benford's Distribution graph included in FIG. 3 schematically shows the first digit of the inter-arrival times of the incoming data packets 26 on the X-axis and the number of occurrences (i.e. frequency) on the Y-axis.

The incoming data packets 26 can be modeled using either single or multiple digits with each additional digit providing more accuracy but at the expense of extra processing being required.

An alternative characteristic that may be used in some situations is the TCP (Transmission Control Protocol) flow information.

When a DoS attack is detected by the system of the present invention, the system enters a filtering stage. The DoS attack is represented in FIG. 3 by window T with incoming data packets 28. The incoming data packets 28 are a mixture of legitimate incoming data packets (i.e. incoming data packets from genuine user computers 16) and malicious incoming data packets (i.e. incoming data packets originating from the malicious party 20). The DoS attack can be detected by the system of the present invention by detecting an abnormal increase in the volume of the incoming traffic stream 24. Typically, when a DoS attack does take place, there is a large spike in the volume of the incoming traffic stream 24 such that the DoS attack is readily apparent.

The filtering stage aims to remove as many of the malicious data packets as possible while still accepting "normal" (i.e. legitimate) data packets from legitimate users 16 or legitimate services. The system of the present invention does this by first sorting all the incoming data packets 28 in the window T by making use of Zipf's Law(which is a known statistical law). This is shown at step 2 in FIG. 3. In that regard, Zipf's Law provides a model of the distribution of terms in a collection. It states that, if $t_1$ is the most common term in the collection, $t_2$ is the next most common, and so on, then the collection frequency $cf_i$ of the $i^{th}$ most common term is proportional to $1/i$, i.e.:

$$cf_i \propto 1/i$$

The distribution graph included in FIG. 3 at step 2 schematically shows the incoming data packets 28 after sorting based on Zipf's Law, with the size or length of the incoming packets 28 on the X-axis and the number of occurrences (i.e. frequency) on the Y-axis. The incoming data packets 28 that are sorted according to Zipf's Law are sorted as a priority queue. The analysis and sorting of the incoming data packets 28 results in the incoming data packets 28 that are most compliant with Zipf's Law being at the head of the queue, and it is these incoming data packets 28 that are part of the normal (i.e. legitimate) traffic because the artificially created incoming data packets (from the DoS attack) have inherently different properties.

The system of the present invention already has an existing distribution (i.e. the rolling Benford's Law compliant distribution) model of the normal traffic obtained in the first step, i.e. the normal behaviour modeling stage, and the next step is to rebuild a distribution that is compliant with Benford's Law using the newly observed incoming data packets 28 in the window T. This is shown at step 3 in FIG. 3, and is carried out in the manner that will now be described. As a consequence of Zipf's Law, the normal (i.e. legitimate) data packets contained in the incoming data packets 28 tend to be found at the head of the queue whereas the crafted (i.e. artificial) malicious data packets contained in the incoming data packets 28 are found towards the middle and tail end of the sorted data packet queue. Once the new Benford's compliant distribution has been rebuilt using the data packets sorted according to Zipf's Law, all the remaining data packets from the incoming data packets 28 that are not used in the rebuilding process are automatically discarded as they are taken to be malicious data packets. On the other hand, the data packets that are compliant with the new Benford's compliant distribution are allowed to pass to the computer system 10 (i.e. the server/s 12 and/or machines 14) for processing. Thus, these data packets are then processed in the same way as data packets originating from legitimate user computers 16.

Thus, in the case of a DoS attack, the present invention is able to categorize the incoming data packets 28 into normal and abnormal (i.e. artificially created) categories. This approach is applicable to both network level and application level DoS attacks and relies on shallow packet inspection.

The method of the present invention may be considered as having three main steps, namely: (1) build a first distribution from the normal traffic which has been proven to be compliant with Benford's Law, (2) when a DoS attack occurs, the packets in the window T are sorted according to Zipf's Law, and (3) the known "normal" traffic distribution is rebuilt in the window T that contains DoS traffic. The method of the present invention may be embodied in an algorithm for execution, an example of which the set out below:

```
GetProbabilities <- window:
    digitCounter := NEW LIST
    FOR length IN window:
        i := FIRST DIGIT OF length
        digitCounter[i]++
    FOR element IN digitCounter:
        element := element / (LENGTH OF window)
    RETURN digitCounter
MainProcedure <- metadatafile, windowsize, benfordSeriesForNthDigit,
THRESHOLD:
    FOR length IN metadatafile:
        GROUP length INTO windows IN GROUPS OF SIZE windowsize
    FOR window IN windows:
        observedProbabilities := EXEC GetProbabilities WITH window
        u := PERFORM WATSON STATISTICAL TEST WITH
OBSERVED PROBABILITIES OF observedProbabilities AND
EXPECTED PROBABILITIES OF benfordSeriesForNthDigit
        IF u < THRESHOLD THEN:
            GLOBAL filterSetting := NEW LIST
            FOR length IN window:
                i := FIRST DIGIT OF length
                filterSetting[i]++
                SEND PACKET RELATING TO length TO
                GOOD STREAM
        ELSE:
            filterCounter := NEW LIST
            FOR length IN window:
                i := FIRST DIGIT OF length
                IF filterCounter[i] < filterSetting[i] THEN:
                    filterCounter[i]++
                    SEND PACKET RELATING TO length TO GOOD STREAM
                ELSE:
                    SEND PACKET RELATING TO length TO BAD STREAM
```

Figure 4:
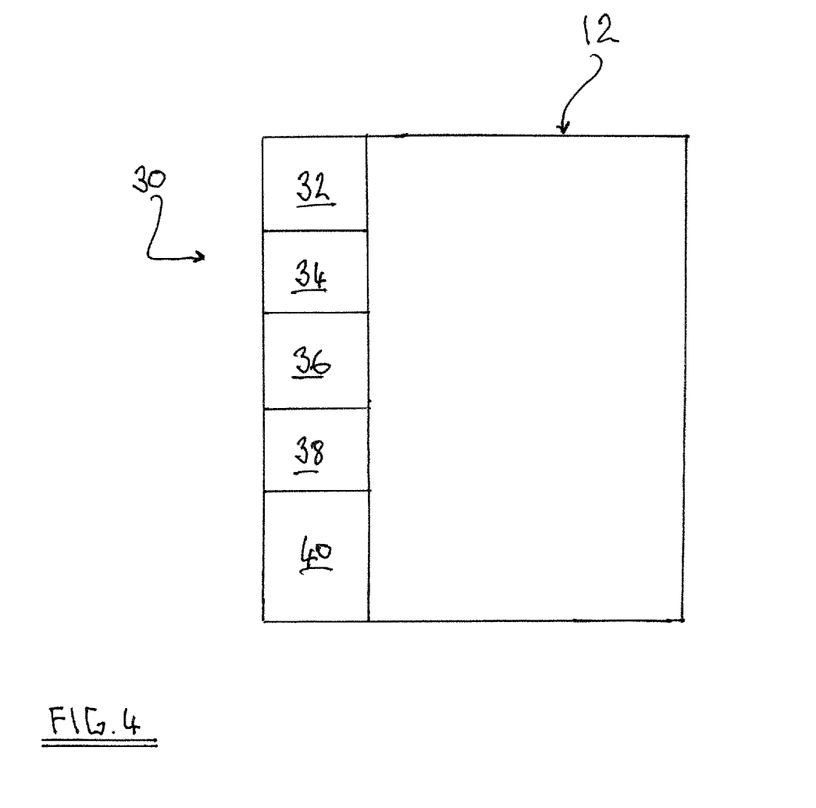
FIG. 4 is a schematic illustration of an embodiment of a system for detecting and mitigating a denial of service attack in accordance with another aspect of the present invention.

In FIG. 4, there is schematically shown a system 30 for detecting and mitigating a denial of service attack in accordance with the present invention. The system 30 is arranged such that it is able to carry out monitoring, analysis and processing of the incoming traffic packets 26/28 in front of the computer system 10, i.e. prior to the incoming traffic packets 26/28 being passed to the computer system 10 for processing. This is schematically represented in FIGS. 1, 2, and 4 by positioning the system 30 in front of the servers/12 such that it is the system 30 that first receives the incoming traffic packets 26/28 from the Internet 18.

The system 30 comprises functional modules or units that are interconnected to carry out the functions of the present invention. Accordingly, the system 30 may comprise a monitor or counter 32 (or other suitable unit) to monitor incoming traffic packets 26/28 directed to the server/s 12 and/or connected devices 14 and detect a DoS attack, a processor 34 to carry out the processing functions on the incoming traffic packets 26/28, a memory 36 to store data, a comparator 38 to compare the sorted distribution of incoming traffic packets 28 with the normal traffic behaviour distribution of the incoming traffic packets 26, and a filter 40 to filter out and discard the incoming traffic packets in the sorted distribution that are not consistent with the normal traffic behaviour distribution of the incoming traffic packets 26.

The processing functions carried out on the incoming traffic packets 26/28 by the processor 34 include first building the distribution of normal traffic behaviour of the incoming traffic packets 26, sorting in accordance with Zipf's Law the incoming traffic packets directed to the server/s 12 and/or connected devices 14 after detecting the DoS attack and creating a sorted distribution of incoming traffic, building a second distribution in accordance with Benford's Law using the incoming traffic packets in the sorted distribution excluding the discarded incoming traffic packets, and allowing the incoming traffic packets in the second distribution to pass to the server/s 12 and/or connected devices 14. In addition, the functions of the comparator 38 and filter 40 may alternatively be carried out by the processor 34.

The data stored by the memory 36 may include the first and second distributions and the sorted distribution.

To demonstrate the implementation and operation of the present invention, a set of experiments were devised and conducted to simulate the activity of a medium sized group of users involved in a networked game. A variety of DoS attacks were then carried out against either the server hosting the networked game or against individual players connected to the server who were playing the game. The traffic (from the players and that generated by the DoS attack) that was directed to the server was collected in its entirety and analysed to determine whether the traffic packets observed were of a normal or abnormal nature. An example of the results obtained from this experiment is described below.

The setup involved 12 players participating in an "Unreal Tournament DeathMatch" game. All players were connected to a single server and the DoS attacks were of two types: server attacks (aimed at all players) and single player targeted attacks (aimed at putting specific players at a disadvantage). The "Unreal Tournament DeathMatch" game uses UDP (User Datagram Protocol) traffic for the communications between the server and the players and thus the DoS attacks were carried out by flooding the targets with useless UDP traffic. The DoS attacks were relatively short in nature as prolonged attacks would completely destroy the ongoing game session (players would be kicked off the server and the server would have to be restarted). The characteristics of the traffic using Benford's and Zipf's Laws are shown in FIGS. 5 and 6.

Figure 5:
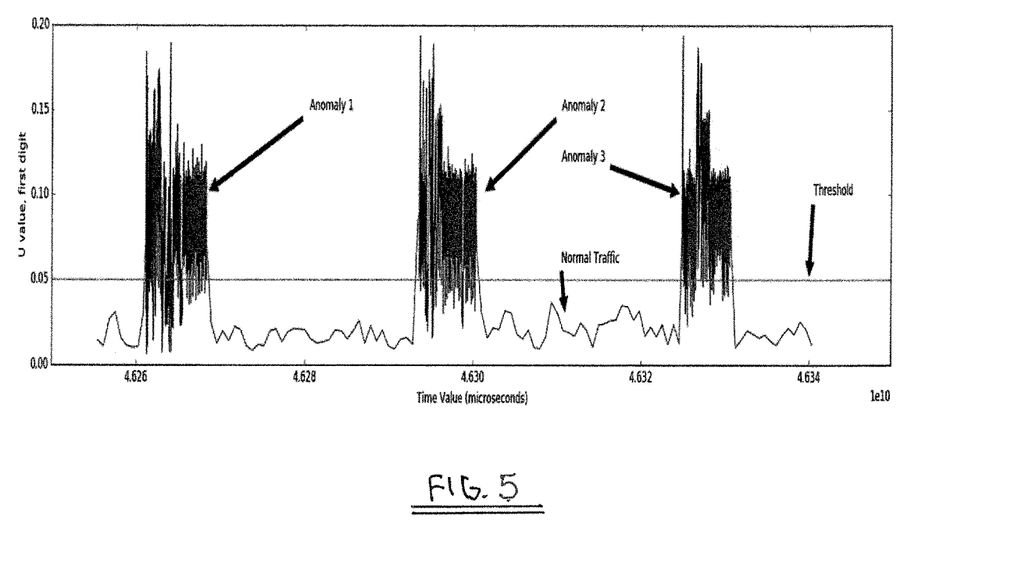
FIG. 5 is a graph showing the value of the first digit of data packets over time for an actual sequence of normal gaming activity interspaced with three DoS attacks.
Figure 6:
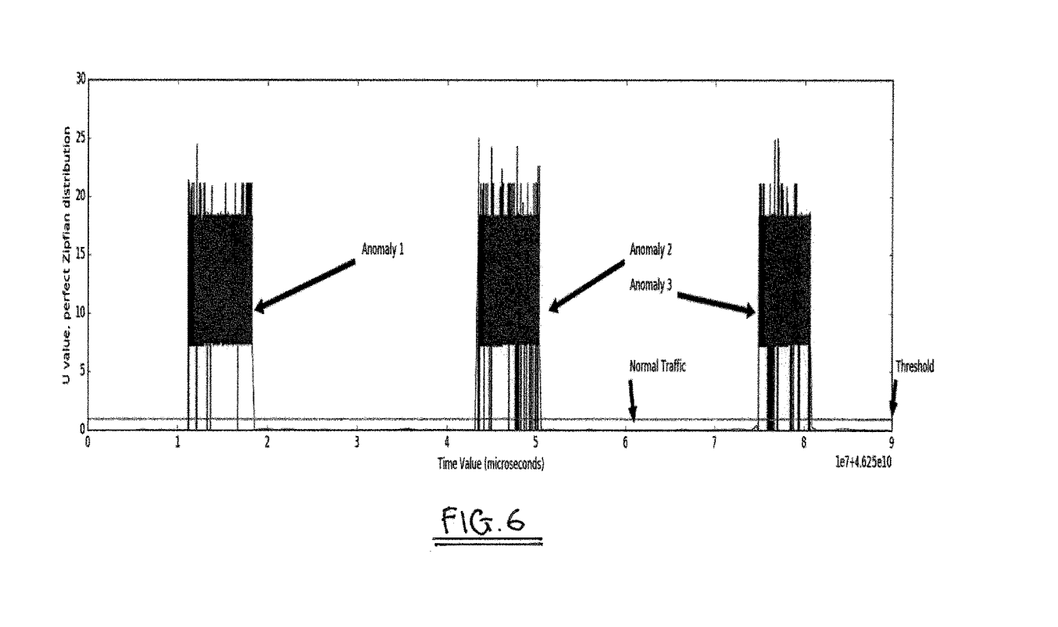
FIG. 6 is a graph showing the results of the analysis and sorting, based on Zipf's law, of the data shown in FIG. 5.

FIG. 5 shows a sequence of normal gaming activity interspaced with three DoS attacks, identified in FIG. 5 as Anomaly 1, Anomaly 2 and Anomaly 3, respectively. As can be seen in FIG. 5, the normal gaming traffic showed that the first digit of the inter-arrival time varies between 0.01 and 0.038; however, when a DoS attack took place, that first digit value would change significantly, indicating that a DoS attack is taking place. The last DoS attack shown in FIG. 5 (Anomaly 3) was directed at the server and resulted in the majority of the players being kicked off.

With the present invention implemented in the networked game experiment hereinbefore described, once the DoS attacks were detected, the incoming traffic packets were analysed and sorted based on Zipf's Law as herein before described with reference to FIG. 3. FIG. 6 shows the results of this analysis for same timeline shown in the Benford's Law data in FIG. 5.

Eliminating the malicious incoming traffic packets required a check of whether a DoS attack was taking place (using Benford's Law) and if that was the case, the incoming traffic packets were sorted based on their lengths using Zipf's Law as herein before described with reference to FIG. 3. Finally, the sorted incoming traffic packets were used to rebuild a new distribution in accordance with Benford's Law and any traffic packets that did not match the distribution were discarded.

Accordingly, the present invention is able to detect and mitigate (i.e. repel or defend against) a DoS attack, such that malicious traffic is discarded (and does not result in the computer system 10 being overwhelmed with incoming data packets) whilst genuine traffic (i.e. data packets from genuine user computers 16) is allowed to pass to the computer system 10 for processing. Consequently, there is no disruption to the service provided by the computer system 10 to users 16, which is beneficial to both the users 16 and the operator of the service provided by the computer system 10.

Advantages of the present invention herein described may include:

it is based on an established and proven set of statistical laws to categorise the incoming traffic and is resistant to packet crafting/spoofing (i.e. intentionally using an incorrect source IP address);

it uses shallow packet inspection (as opposed to deep packet inspection, used by some prior methods and systems, which inspects the payload information of the data packets), and so requires relatively limited resources for implementation in contrast to the most current methods of handling DoS attacks;

it is applicable to both network and application level DoS attacks;

it is fully adaptive to each organization or service and thus does not rely on extensive human driven analysis and customization;

it can be implemented as a software agent (for example, such as functional modules, programs routines, etc., which may be stored in one or more memory devices or storage devices, such as non-transitory computer readable storage medium/s) to perform the functions as herein before described, a hardware based application or as a combination of them, thus offering a high degree of flexibility from the point of view of implementation and deployment.

Whilst one or more preferred embodiments of the present invention have been herein before described, the scope of the present invention is not limited to those specific embodiment(s), and may be embodied in other ways, as will be apparent to a person skilled in the art.

Modifications and variations such as would be apparent to a person skilled in the art are deemed to be within the scope of the present invention.

The invention claimed is:

1. A method for detecting and mitigating a denial of service attack comprising monitoring incoming traffic packets directed to at least one destination server and/or connected devices, building a first distribution of the incoming traffic packets in accordance with Benford's Law of normal traffic behaviour directed to the at least one destination server and/or connected devices, detecting a denial of service attack directed at the destination server and/or connected devices, sorting in accordance with Zipf's Law the incoming traffic packets directed to the at least one destination server and/or connected devices after detecting the denial of service attack and creating a sorted distribution of incoming traffic packets, comparing the sorted distribution of incoming traffic packets with the first distribution of the incoming traffic packets, discarding the incoming traffic packets in the sorted distribution that are not consistent with the first distribution, building a second distribution in accordance with Benford's Law using the incoming traffic packets in the sorted distribution excluding the discarded incoming traffic packets, allowing the incoming traffic packets in the second distribution to pass to the destination server and/or connected devices.

2. A method according to claim 1, wherein detecting a denial of service attack directed at the at least one destination server and/or connected devices comprises detecting an increase in the volume of traffic directed to the at least one destination server and/or connected devices.

3. A method according to claim 1, wherein a selected characteristic of individual incoming data packets is used to build the first distribution.

4. A method according to claim 3, wherein the selected characteristic that is used to build the first distribution is an inter-arrival time of the incoming traffic packets.

5. A method according to claim 1, wherein the first distribution is a rolling distribution built using a moving window technique applied to the incoming traffic packets.

6. A non-transitory computer readable storage medium including instructions that, when executed by a processor, cause the following steps to be performed
monitoring incoming traffic packets directed to at least one destination server and/or connected devices,
building a first distribution of the incoming traffic packets in accordance with Benford's Law of normal traffic behaviour directed to the at least one destination server and/or connected devices,
detecting a denial of service attack directed at the destination server and/or connected devices,
sorting in accordance with Zipf's Law the incoming traffic packets directed to the at least one destination server and/or connected devices after detecting the denial of service attack and creating a sorted distribution of incoming traffic packets,
comparing the sorted distribution of incoming traffic packets with the first distribution of the incoming traffic packets,
discarding the incoming traffic packets in the sorted distribution that are not consistent with the first distribution,
building a second distribution in accordance with Benford's Law using the incoming traffic packets in the sorted distribution excluding the discarded incoming traffic packets, and
allowing the incoming traffic packets in the second distribution to pass to the destination server and/or connected devices.

7. A non-transitory computer readable storage medium according to claim 6, wherein detecting a denial of service attack directed at the at least one destination server and/or connected devices comprises detecting an increase in the volume of traffic directed to the at least one destination server and/or connected devices.

8. A non-transitory computer readable storage medium according to claim 6, wherein a selected characteristic of individual incoming data packets is used to build the first distribution.

9. A non-transitory computer readable storage medium according to claim 6, wherein the selected characteristic that is used to build the first distribution is an inter-arrival time of the incoming traffic packets.

10. A non-transitory computer readable storage medium according to claim 6, wherein the first distribution is a rolling distribution built using a moving window technique applied to the incoming traffic packets.

11. A system for detecting and mitigating a denial of service attack comprising at least one memory to store functional instructions,
a processor operatively connected to the memory to execute the instructions stored in the memory such that the following steps are performed
monitoring incoming traffic packets directed to at least one destination server and/or connected devices,
building a first distribution of the incoming traffic packets in accordance with Benford's Law of normal traffic behaviour directed to the at least one destination server and/or connected devices,
detecting a denial of service attack directed at the destination server and/or connected devices,
sorting in accordance with Zipf's Law the incoming traffic packets directed to the at least one destination server and/or connected devices after detecting the denial of service attack and creating a sorted distribution of incoming traffic packets,
comparing the sorted distribution of incoming traffic packets with the first distribution of the incoming traffic packets,
discarding the incoming traffic packets in the sorted distribution that are not consistent with the first distribution,
building a second distribution in accordance with Benford's Law using the incoming traffic packets in the sorted distribution excluding the discarded incoming traffic packets, and
allowing the incoming traffic packets in the second distribution to pass to the destination server and/or connected devices.

12. A system according to claim 11, wherein detecting a denial of service attack directed at the at least one destination server and/or connected devices comprises detecting an increase in the volume of traffic directed to the at least one destination server and/or connected devices.

13. A system according to claim 11, wherein a selected characteristic of individual incoming data packets is used to build the first distribution.

14. A system according to claim 11, wherein the selected characteristic that is used to build the first distribution is an inter-arrival time of the incoming traffic packets.

15. A system according to claim 11, wherein the first distribution is a rolling distribution built using a moving window technique applied to the incoming traffic packets.

* * * * *